Sept. 25, 1945.  P. E. GELDHOF ET AL  2,385,623
MEANS FOR TRANSMITTING OSCILLATORY MOTION
Filed June 24, 1943  2 Sheets-Sheet 1

Inventors
PETER EDUARD GELDHOF.
VERNON J. WOOSTER.
by Atty's.

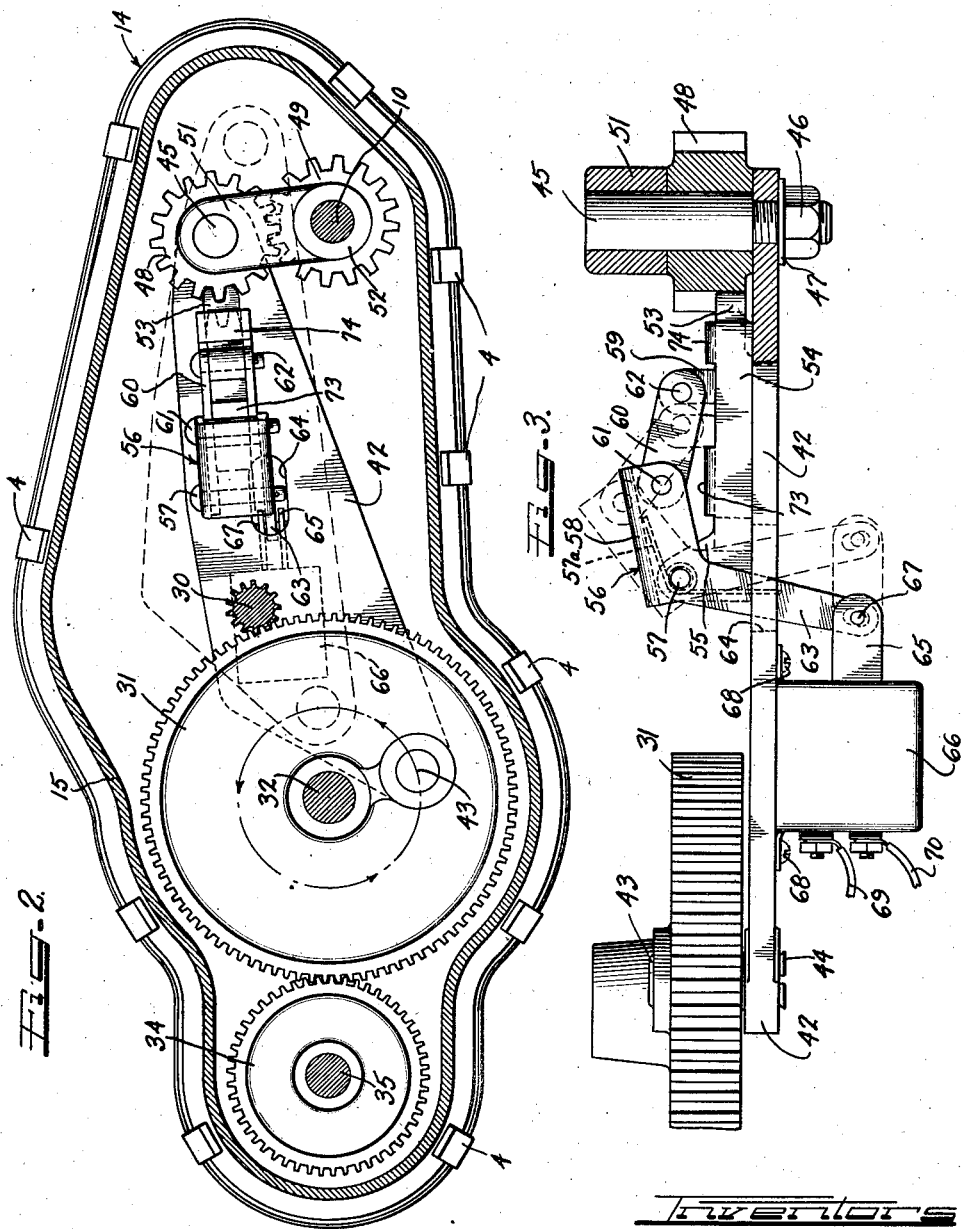

Patented Sept. 25, 1945

2,385,623

UNITED STATES PATENT OFFICE 2,385,623

MEANS FOR TRANSMITTING OSCILLATORY MOTION

Peter Eduard Geldhof and Vernon J. Wooster, St. Joseph, Mich., assignors to Nineteen Hundred Corporation, St. Joseph, Mich., a corporation of New York Application June 24, 1943, Serial No. 492,102

10 Claims. (Cl. 68—133)

The present invention relates to apparatus for transmitting oscillatory motion from a power source to a member to be driven. More particularly, the invention is concerned with the structure and mode of operation of a novel form of transmission embodying electrically operated means for engaging and disengaging the reciprocating drive means of said transmission from the member to be driven.

It is an object of the present invention to provide a novel oscillatory drive mechanism.

It is a further object of the present invention to provide an oscillatory drive mechanism for actuating a member to be driven associated therewith with a minimum of lost motion in its operation.

It is a still further object of the present invention to provide an oscillatory drive mechanism, such, for example, as that employed in washing machines or the like for actuating the agitator mechanism.

The present invention contemplates, among other things, a method of producing oscillatory motion substantially free from dwell or lost motion which frequently occurs in conventional operations as the reciprocating member employed in producing such oscillatory motion approaches the extremities of its stroke. The present method not only virtually eliminates such lost motion or dwell period but also obviates the operational shocks which customarily accompany these operations.

The method of the present invention involves the steps of producing a rapid motion throughout the major portion of each stroke of the reciprocating member, slowing up the rate of movement produced as the reciprocating member approaches one extremity of the stroke so as to gradually merge from one direction of motion into the reverse with a minimum of shock, starting and stopping the operation at any desired point in the cycle and manually controlling the starting and stopping operations by causing the flow of a force such, for example, as by closing an electrical circuit to instantly effect starting or stopping of the reciprocating member.

It is a further object of the present invention to start or stop the operational steps involved in the production of an oscillatory motion which is free from dwell and operational shocks at any desired point in the cycle and manually controlling such starting or stopping as the case may be, by causing the flow of force to instantly effect the operation.

In accordance with the general features of the present invention there is provided an oscillatory drive mechanism which comprises a reciprocating member, a member to be driven, and electrically operated coupling means associated with said reciprocating member for disengageably connecting said reciprocating member and said member to be driven.

The invention further contemplates transmission means which comprises a drive member, a member to be driven, reciprocating means actuated by said drive member, coupling means for connecting said reciprocating means and said member to be driven, and slidable means associated with said reciprocating means for selective engagement with and disengagement from said coupling means.

In accordance with other features of the present invention, there is provided in a washing machine which includes a tub, an agitator in said tub, and a power source, means for actuating the agitator from the power source comprising a drive member operated from said power source, reciprocating means actuated by said drive member, coupling means for connecting said reciprocating means with said agitator, and electrically operated means associated with said reciprocating means for selective engagement with and disengagement from said coupling means.

Still other features and advantages of the present invention will be apparent from the following description of the drawings illustrating one embodiment of the invention in which:

Figure 2 represents a horizontal section through the upper portion of the oscillatory drive mechanism of Figure 1 showing the arrangement of the parts therein; and Figure 3 is an elevation with parts broken away and in section illustrating the operating relation of the elements of the oscillatory drive mechanism.

Figure 1:
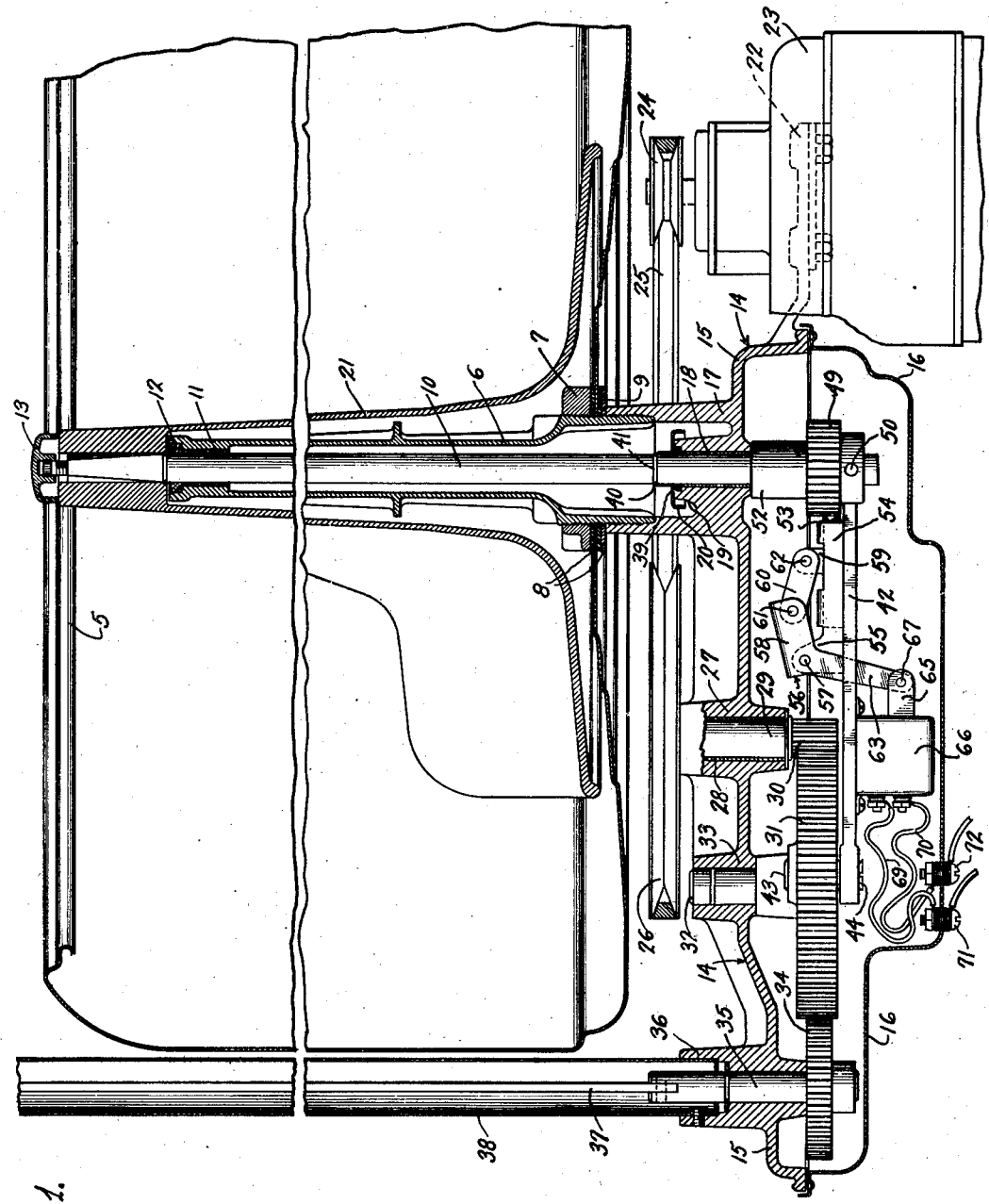
Figure 1 represents a vertical sectional elevation of a typical form of apparatus in which the oscillatory drive mechanism of the present invention is particularly advantageously employed.

One embodiment of the present invention is shown in Figure 1 as being adapted to employment in a washing machine in which a tub 5 is provided which is supported by a suitable base or casing structure (not shown). Extending vertically through an opening in the center of the base of tub 5 is a generally cylindrical post 6 which is secured to the base of the tub 5 as by means of a ring member 7 threaded on the base thereof, suitable gaskets 8 being provided above and below the base of tub 5 and cooperating with a washer 9 to prevent leakage through the opening therein. A shaft 10 which is disposed within said cylindrical post 6 and extends through the upper end thereof is journalled in a sleeve 11 in the upper end of said post 6 and a washer member 12 recessed in the upper end thereof.

Mounted upon the uppermost end of shaft 10 is an agitator member 21 which is secured thereto as by means of the cap screw 13 which is threaded into the uppermost end of the shaft 10. An oscillatory drive mechanism, which may take the form of the transmission 14, is supported from the underside of the tub 5 and is enclosed in a suitable casing which may advantageously be made up of an upper casting member 15 and a lower stamping portion 16 held together by a plurality of clips 4 disposed at spaced intervals therearound. The post 6 is threaded into the upper end of a boss 17 extending upwardly from the top of the casting 15 and abutting against the washer 9. The lower end of the shaft 10 which extends into the transmission 14 is journalled in the sleeve bearing 18 inserted in the internal boss portion 19 of the boss 17 of casting 15. A washer 39 is recessed in the uppermost end of said boss 19 which also supports an inverted substantially cup-shaped member 20 which cooperates with a snap ring 40 encircling the shaft 10 and disposed in the annular groove 41 cut therein to support said shaft 10 in proper axial relation with respect to the transmission 14.

A suitable mounting or bracket 22 is provided on the casting 15 of transmission 14 to which is secured a power source, in this case a motor 23, which serves through the pulleys 24 and 26 and the belt 25 to drive the transmission 14. The transmission pulley 26 is mounted upon a stub shaft 29 journalled in a sleeve bearing 28 and extending through the boss portion 27 of casting 15. On the lowermost end of said shaft 29 is mounted a gear 30 which meshes with a drive gear 31 supported from the upper casting 15 of the transmission 14 as by means of a stub shaft 32 mounted in the boss 33 on said casting 15. A gear 34 mounted on the lower end of a stub shaft 35 which extends upwardly through the external boss 36 on the casting 15 of transmission 14 operates to drive through the connecting member 37 a wringer unit (not shown) or other associated apparatus which may be mounted upon the vertically extending column 38 secured to the upper end of boss 36.

An arm 42 having one end thereof pivoted about a pin 43 eccentrically disposed with respect to the stub shaft 32 supporting the driving gear 31 is secured to said pin 43 by means of the machine screw 44. Adjacent the right-hand end of the arm 42 (as seen in the drawings) and on the upper side thereof is mounted a pin 45 one end of which extends through an aperture in said arm 42 and is threaded so as to be secured to said arm 42 as by means of a nut 46 and a washer 47. A gear 48 is freely rotatably mounted upon pin 45 and meshes with a gear 49 which is secured to the lowermost end of shaft 10 by means of a set screw 50. A link 51 is also mounted upon the pin 45 and is provided with a collar portion 52 which surrounds the shaft 10, the mounting of said link 51 about pin 45 and shaft 10 being such as to provide freedom of pivotal movement of said link 51 with respect to its mountings as the arm 42 is reciprocated. Since the freely rotatably mounted gear 48 is maintained in engagement with the gear 49 on shaft 10 by virtue of the link 51, it is free to rotate about pin 45 as the arm 42 is reciprocated.

For the purpose of locking said gear 48 in fixed relation with respect to the pin 45 on the reciprocating arm 42 when it is desired to actuate the shaft 10, a dog 53 which is adapted to engage one or more of the teeth of gear 48 is slidably disposed in a mounting 54 secured to the arm 42, the extent of its slidable movement being defined by stops 73 and 74 formed on mounting 54. A projection 55 on the mounting 54 provides a pivotal support for a bell crank lever 56 which is secured thereto by pin 57. A spring 57a is mounted about the pin 57 on the under side of arm 58 of the bell crank lever 56. Arm 58 of bell crank lever 56 is connected to a projecting lug 59 on dog 53 by means of the member 60 and pins 61 and 62. The downwardly extending arm 63 of bell crank lever 56 passes through an opening 64 in reciprocating arm 42 and is connected with a plunger 65 of a solenoid 66 by means of the pin 67. The solenoid 66 is preferably mounted upon the under side of reciprocating arm 42 as by means of the bolts 68 and is provided with electrical connections 69 and 70 which are connected to posts 71 and 72 mounted upon the lower portion 16 of the casing of transmission 14.

The posts 71 and 72 are connected into an electrical circuit which energizes the motor 23 and communicates with a suitable push-button or switch (not shown) which serves to close the electrical circuit to the solenoid 66 when it is desired to cause the dog 53 to engage the freely rotatably mounted gear 48.

In the operation of the washing machine illustrated in Figure 1 on the drawings, the motor connection may be plugged into a convenience outlet or connected to any other suitable source of electrical energy when the washing operation is to be begun. Thus, the motor 23 through the pulleys 24 and 26 and the belt 25 will operate the driving gear 31 by reason of its engagement with the gear 30 mounted upon the shaft 29 which supports the pulley 26. The operation of driving gear 31 will cause the gear 34, shaft 35 and connecting member 37 to be rotated and, in addition, will cause the arm 42 by reason of its eccentric connection to said driving gear 31 to be reciprocated along a path which corresponds substantially to the longitudinal axis of the transmission 14.

At the beginning of operation, the solenoid 66 is deenergized and the bell crank lever 56 will occupy the position illustrated in the dotted lines in Figure 3 of the drawings. By virtue of this disposition of the bell crank lever 56, the dog 53 slidably disposed in the mounting 54 will, therefore, occupy the position indicated in dotted lines in Figure 2 of the drawings. The gear 48 will be free to rotate about the pin 45 as the reciprocating arm 42 is reciprocated by reason of its eccentric mounting upon the driving gear 31. While the gear 48 is engaged with gear 49 mounted upon the agitator shaft 10 by reason of the link 51 it will not, since it is free to rotate about the pin 45, operate the shaft 10.

At the desired time, the operator may by pressing a button or closing a switch (not shown) provided therefor, as the case may be, energize the solenoid 66 thus causing the plunger 65 thereof to move toward the left as seen in Figure 3 of the drawings. This movement of plunger 65 moves the bell crank arm 56 into the position shown in full lines in Figure 3. The bell crank lever 56 causes the dog 53 to move instantly toward the right as seen in full lines in Figures 2 and 3 of the drawings so as to engage one or more of the teeth of the gear 48. Thereafter, the gear 48 is held against rotation with respect to the pin 45 and as the arm 42 is reciprocated, an oscillating motion will be transmitted to the shaft 10 and agitator 21 through the engagement of gear 48 with gear 49 mounted upon said shaft 10.

When it is desired to halt the operation of the agitator 21, the operator merely operates the button or switch cutting the electrical circuit connected to the solenoid 66 thereby de-energizing it. The spring 57a urges the arm 58 of bell crank lever 56 upwardly causing the plunger 65 thereof to move to the right as seen in Figure 3 whereby the parts of the apparatus will again assume the positions shown in dotted lines and instantly disengaging the dog 53 from gear 48. The gear 48 will once again be free to rotate about the pin 45 and will no longer drive the gear 49, thereby stopping the oscillatory movement of shaft 10 and agitator 21.

The apparatus of the present invention is particularly advantageous in that it provides a continuous oscillatory movement of the driven member with virtually no lost motion. This is brought about by the fact that as the reciprocating arm 42 approaches the extreme positions of its reciprocatory movement, it moves only slightly but, in this interval, the end of said arm on which gear 48 is held against rotation pivots about the axis of shaft 10 and causes the gear 49 on said shaft, with which it is engaged, to rotate slowly until the arm begins its reverse stroke. Other forms of connections or coupling members employed between the reciprocating arm and the driven member cause a distinct dwell or period of lost motion in the driven member as the reciprocating arm approaches and passes through the extremities of its reciprocating cycle. Shocks which frequently accompany such abrupt changes of direction are also substantially completely eliminated.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. In a washing machine including a tub, an agitator in said tub and a power source, means for actuating said agitator from said power source comprising a drive member operated from said power source, reciprocating means actuated by said drive member, means freely rotatably mounted on said reciprocating means for driving the agitator, and slidable means associated with said reciprocating means and movable in a plane substantially parallel to the plane of movement of said reciprocating means and for selective engagement with said rotatably mounted means to hold the same in fixed relation to said reciprocating means to drive said agitator and disengagement from said rotatably mounted means to stop said agitator.

2. In a washing machine including a tub, an agitator in said tub and a power source, transmission means for controlling the operation of said agitator from said power source comprising a drive member operated from said power source, reciprocating means actuated by said drive member, a toothed member for actuating said agitator, a second toothed member freely rotatably mounted on the reciprocating member for driving the toothed member for actuating the agitator, means slidably mounted on said reciprocating means for movement in a plane substantially perpendicular to the axis of rotation of said second toothed member and for selective engagement with said rotatably mounted toothed member to hold the same in fixed relation to said reciprocating means to drive said agitator and disengagement from said rotatably mounted toothed member to stop said agitator, and electrical control means for operating said slidably mounted means.

3. In a washing machine including a tub, an agitator in said tub and a power source, transmission means for controlling the operation of said agitator from said power source comprising a drive member operated from said power source, reciprocating means actuated by said drive member, a drive gear for said agitator, a second gear freely rotatably mounted on the reciprocating member and meshing with the agitator gear, and electrically operated means associated with said reciprocating means mounted for movement in a plane substantially perpendicular to the axis of rotation of said gear and for selective engagement with said rotatably mounted gear to hold the same in fixed relation to said reciprocating means to drive said agitator and disengagement from said rotatably mounted gear to stop said agitator.

4. An oscillatory drive mechanism comprising a drive member, a member to be driven, reciprocating means secured to said drive member, coupling means for connecting said reciprocating means and said member to be driven, slidable means associated with said reciprocating means for selectively connecting said reciprocating means in driving relation with said coupling means.

5. An oscillatory drive mechanism comprising a drive member, a member to be driven, reciprocating means secured to said drive member, means freely rotatably mounted on said reciprocating means for driving the member to be driven, means slidable with respect to said reciprocating means for selective engagement with said rotatably mounted means to hold the same in fixed relation to said reciprocating means to drive said member to be driven and disengagement from said rotatably mounted means to stop said member to be driven, and control means for actuating said slidable means.

6. An oscillatory drive mechanism comprising a drive member, a member to be driven, reciprocating means secured to said drive member, a toothed member freely rotatably mounted on the reciprocating means for engagement with the member to be driven, and means slidable with respect to said reciprocating means for selective engagement with and disengagement from the toothed member.

7. An oscillatory drive mechanism comprising a power source, reciprocating means actuated by said power source, a member to be driven, coupling means for connecting said reciprocating means and said member to be driven, slidable means associated with said reciprocating means for selective engagement with and disengagement from said coupling means, and electrical control means for actuating said slidable means.

8. An oscillatory drive mechanism comprising a power source, reciprocating means actuated by said power source, a gear freely rotatably mounted upon said reciprocating means, a gear to be driven engaging said freely rotatably mounted gear, means for maintaining said gears in engagement, slidable means for disengageably contacting said freely rotatably mounted gear so as to prevent its rotation, and means associated with said reciprocating means for selectively engaging said contacting means from said freely rotatably mounted gear.

9. In a washing machine including a tub, an agitator in said tub, and a power source, means for actuating said agitator from said power source comprising a drive member operated from said power source, reciprocating means actuated by said drive member, a gear rotatably mounted on said reciprocating means adjacent the free end thereof, a shaft supporting said agitator, a gear secured to said shaft, a link member pivotally connected to said shaft and the free end of said reciprocating means for maintaining the rotatably mounted gear and the agitator gear in engagement, slidably shiftable means for engaging the rotatably mounted gear to prevent its rotation and to cause the agitator shaft to be oscillated by said reciprocating means, and electrical control means for engaging and disengaging said shiftable means with respect to said rotatably mounted gear.

10. An oscillatory drive mechanism comprising a reciprocating member, a member to be driven, means for coupling said member to be driven and said reciprocating member, said coupling means including driving means freely rotatably mounted upon said reciprocating member, slidable means associated with said reciprocating member for selectively engaging said driving means to prevent its rotation and to transmit oscillatory motion to said member to be driven, and electrical control means for selectively engaging and disengaging said slidable means and said driving means.

PETER EDUARD GELDHOF.
VERNON J. WOOSTER.